United States Patent [19]

Takamiya et al.

[11] Patent Number: 5,179,418
[45] Date of Patent: Jan. 12, 1993

[54] DOPPLER VELOCIMETER AND APPARATUS USING THE SAME

[75] Inventors: Makoto Takamiya, Kawasaki; Hiroshi Sugiyama, Yokohama; Yasuhiko Ishida, Tokyo; Hidejiro Kadowaki, Yokohama, all of Japan

[73] Assignee: Canon Kabushiki Kaisha, Tokyo, Japan

[21] Appl. No.: 703,766

[22] Filed: May 21, 1991

[30] Foreign Application Priority Data

May 21, 1990 [JP] Japan .................. 2-130595

[51] Int. Cl.$^5$ .............................. G01P 3/36
[52] U.S. Cl. .................................. 356/28.5
[58] Field of Search ............... 356/28.5, 28; 250/548; 367/90; 346/18

[56] References Cited

U.S. PATENT DOCUMENTS

| | | | |
|---|---|---|---|
| 4,148,585 | 4/1979 | Bargeron et al. | 356/28.5 |
| 4,696,568 | 9/1987 | Weistra | 356/28.5 |
| 4,732,479 | 3/1988 | Tanaka et al. | 356/356 |
| 4,948,257 | 8/1990 | Kaufman et al. | 356/28.5 |

FOREIGN PATENT DOCUMENTS

| | | |
|---|---|---|
| 127244 | 5/1984 | European Pat. Off. . |
| 391278 | 3/1990 | European Pat. Off. . |
| 63-001951 | 1/1988 | Japan . |
| 63-042448 | 2/1988 | Japan . |

OTHER PUBLICATIONS

Oldengarm et al., Journal of Physics E: Scientific Instruments, 1975, vol. 8.
Eiju et al., Applied Optics, vol. 20, #22, Nov. 15, 1981.
Greated et al., Electro-Optics/Laser International '76 UK, Mar. 9–11, 1976.

Primary Examiner—Ian J. Lobo
Attorney, Agent, or Firm—Fitzpatrick, Cella, Harper & Scinto

[57] ABSTRACT

This invention is characterized in that a light beam from a light source is made to enter a diffraction grating and ± nth-order (n=1,2, . . . ) diffracted lights from the diffraction grating are made to enter a moving object at an angle substantially equal to the angle of intersection of the angles of diffraction of the two diffracted lights from the diffraction grating. As a result, the two diffracted lights are converged by a lens system provided between the diffraction grating and the light source on the moving object and intersect with each other. Scattered light subjected to Doppler shift by the moving object is detected by photodetector thereby detecting the velocity information of the moving object.

14 Claims, 6 Drawing Sheets

DOPPLER VELOCIMETER AND APPARATUS USING THE SAME

BACKGROUND OF THE INVENTION

1. Field of the Invention

This invention relates to a Doppler velocimeter, and more particularly to a Doppler velocimeter in which, for example, a laser beam is radiated upon an object or fluid which is moving (including fine particles in the fluid, hereinafter referred to as the "moving object" or "moving fluid") and the shift of the frequency of scattered light subjected to a Doppler shift is detected in conformity with the velocity of the moving object to thereby measure the velocity of the moving object in a non-contact manner.

2. Related Background Art

A laser Doppler velocimeter has heretofore been used as an apparatus for measuring the velocity of a moving object in a non-contact manner. The laser Doppler velocimeter is an apparatus for measuring the velocity of a moving object by the utilization of the effect that a laser beam is applied to the moving object and the frequency of scattered light from the moving object shifts in proportion to the velocity of the moving object (the Doppler effect).

Figure 6:
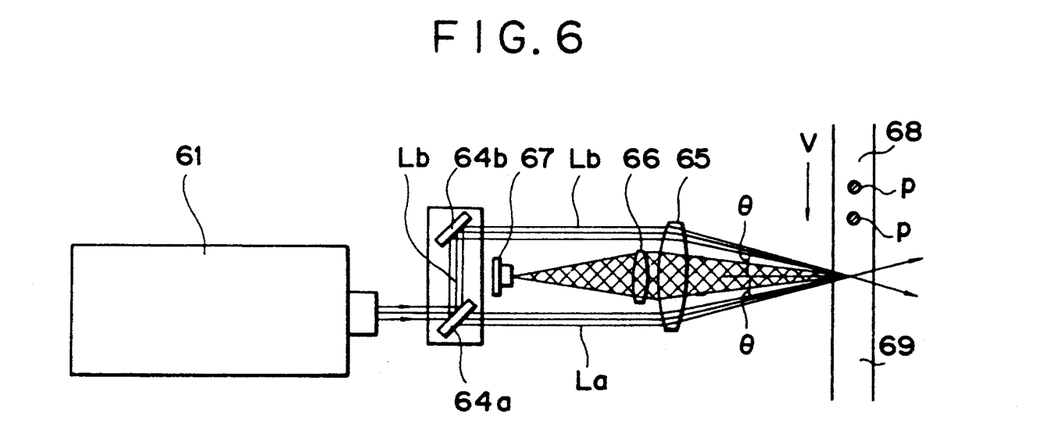
FIG. 6 is a schematic view of a Doppler velocimeter according to the prior art.

FIG. 6 of the accompanying drawings is an illustration showing an example of the laser Doppler velocimeter according to the prior art for detecting chiefly the velocity of moving fluid in a tube.

In FIG. 6, a laser beam emitted from a laser (He-Ne laser) 61 is divided into transmitted light La and reflected light Lb by a beam splitter (half mirror) 64a.

The transmitted light La is converged by a converging lens 65 and enters moving fluid 68 at an angle $\theta$, the moving fluid 68 moving in a tube 69 at a velocity V. On the other hand, the reflected light Lb is reflected by a mirror 64b, and thereafter is converged by the converging lens 65 and enters the moving fluid 68 at an angle $\theta$ so as to intersect the transmitted light La in the tube 69. The transmitted light La and the reflected light Lb are set so as to substantially converge at predetermined locations in the tube 69.

If at this time, fine particles (minute particles such as impurities) P are included in the moving fluid 68, the incident light beams La and Lb will be scattered by the fine particles P. The scattered lights from the fine particles P are condensed by the converging lens 65 and a condensing lens 66 and detected by a photodetector 67, whereby they are converted into electrical signals.

At this time, the frequencies of the scattered lights by the two light beams La and Lb are subjected to Doppler shifts $+\Delta f$ and $-\Delta f$, respectively, in proportion to the velocity V. When, the wavelength of the laser beam is $\lambda$, the variation $\Delta f$ in the frequency can be represented by the following equation (1):

$$\Delta f = V \cdot \sin(\theta)/\lambda \qquad (1)$$

The scattered lights subjected to the Doppler shifts $+\Delta f$ and $-\Delta f$ interfere with each other and bring about a light-and-shade change on the light receiving surface of the photodetector 67. The frequency F thereof is given by the following equation (2):

$$F = 2 \cdot \Delta f = 2 \cdot V \cdot \sin(\theta)/\lambda \qquad (2)$$

If the frequency F of the photodetector 67 (hereinafter referred to as the "Doppler frequency") is measured, the velocity V of the fine particles P, i.e., the moving fluid 68 including the fine particles p, can be found from equation (2).

In the laser Doppler velocimeter according to the prior art, as is apparent from equation (2), the Doppler frequency F is in inverse proportion to the wavelength $\lambda$ of the laser, and accordingly, it has been necessary to use a laser source capable of emitting a light having stable wavelength in the laser Doppler velocimeter. A gas laser such as He-Ne laser is often used as a laser source of stable wavelength capable of continuous oscillation, but such laser has required a bulky laser oscillator and a high voltage power source, and this has led to the tendency that the apparatus becomes bulky and expensive.

Also, a laser diode (or a semiconductor laser) used in a compact disk, a video disk, optical fiber communications or the like is super-compact and easy to drive, but has suffered from the problem of temperature dependence.

Figure 7:
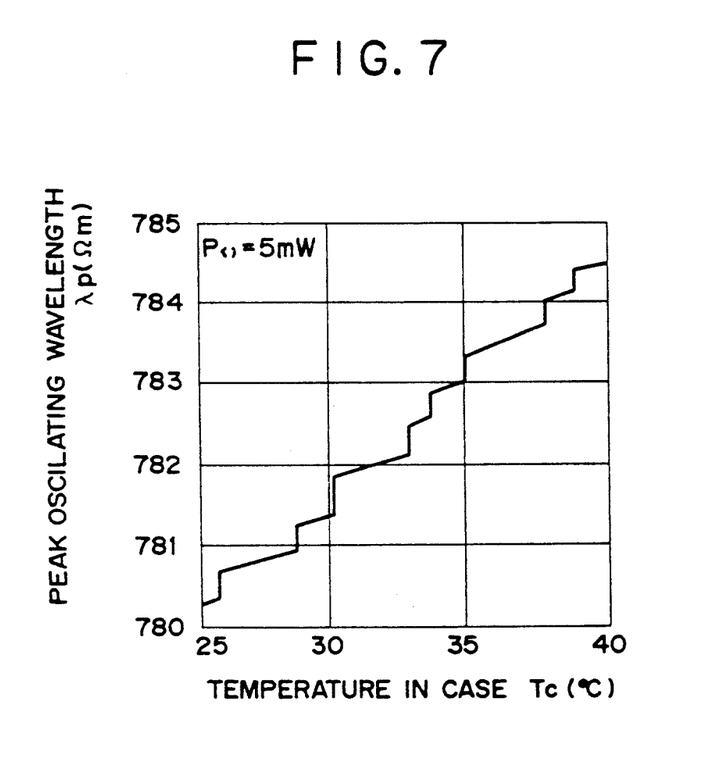
FIG. 7 illustrates the temperature dependence of the oscillating wavelength of a laser diode.

FIG. 7 of the accompanying drawings (reproduced from Mitsubishi Semiconductor Data Book, 1987, (Chapter: Optical Semiconductor Elements) illustrates an example of the standard temperature dependence of a laser diode, and in this figure, the portion in which the wavelength varies continuously is due chiefly to a temperature variation in the refractive index of the active layer of the laser diode, and is 0.05 to 0.06 nm/°C. On the other hand, the portion in which the wavelength varies discontinuously is called longitudinal mode hopping and is 0.2 to 0.3 nm/°C.

A method of controlling the laser diode to a predetermined temperature is generally adopted to stabilize the wavelength. In this method, it is necessary to mount temperature control members such as a heater, a radiator and a temperature sensor on the laser diode with small heat resistance and effect temperature control precisely. As a result, the laser Doppler velocimeter becomes relatively bulky and costly and moreover, the instability caused by the aforementioned longitudinal mode hopping cannot completely be eliminated.

Also, when the velocity (flow velocity) of fluid as a moving object or a minute particle such as a liquid droplet is to be detected, the detection is effected by detecting scattered light scattered by the minute particle or a fine particle included in the fluid and therefore, it is necessary to enclose liquid in a tube and converge a light beam in the tube or the fine particle to achieve the effective utilization of the laser beam applied. Therefore, it is necessary to use a relatively large converging lens in which aberrations are well corrected, and this has led to the problem that the entire apparatus becomes bulky and complicated.

SUMMARY OF THE INVENTION

It is the object of the present invention to provide a Doppler velocimeter which does not depend on the fluctuation of the wavelength of a light beam emitted from a light source and which does not use a large converging lens, but can detect, for example, the velocity of a moving object or moving fluid highly accurately by a simple construction.

DETAILED DESCRIPTION OF THE PREFERRED EMBODIMENTS

Figure 1:
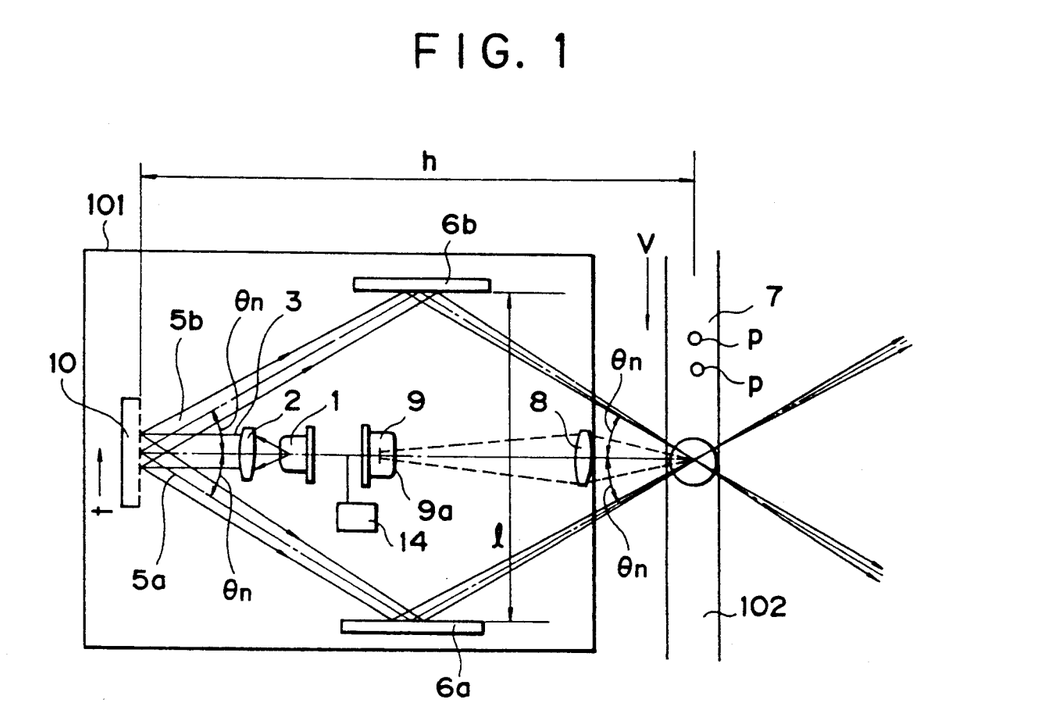
FIG. 1 is a schematic view of essential portions of an optical system according to a first embodiment of the present invention.

Referring to FIG. 1, which is a schematic view of essential portions of an optical system according to a first embodiment of the present invention, the reference numeral 101 designates a Doppler velocimeter The reference numeral 1 denotes a light source which comprises, for example, a laser diode or a semiconductor laser (hereinafter referred to as the "laser"). The reference numeral 2 designates a converging lens which converges a light beam produced from the laser 1 into a convergent light beam 3. That is, the laser 1 is disposed at a location far from the focus position of the converging lens 2. The reference numeral 10 denotes a diffraction grating having a grating pitch $d_1$ which is set so as to diffract ± nth-order diffracted lights of the reflection type at an angle of diffraction $\theta_n$. The reference characters 6a and 6b designate reflecting mirrors which are disposed in opposed relationship with each other and perpendicular to the direction of the grating arrangement of the diffraction grating 10. The reference numeral 7 denotes moving fluid which is moving through a tube 102 at a velocity V in the direction of arrow 7a. At this time, fine particles P included in the moving liquid 7 in the tube 102 are also moving at the same velocity. (Where what is designated by 7 is a moving object, the tube 102 is unnecessary).

In the present embodiment, when the convergent light beam 3 passed through the converging lens 2 is diffracted by the diffraction grating 10, ±nth-order diffracted lights 5a and 5b are reflected by the mirrors 6a and 6b and thereafter are converged in the tube 102. The light beam can be made to convergently enter the fine particles P in the tube 102, thus achieving the effective utilization of the light beam.

The reference numeral 8 designates a condensing lens which condenses on the detection surface 9a of a photodetector 9 as detection means scattered light subjected to Doppler shift by the fine particles P included in the moving fluid 7.

The reference numeral 14 denotes calculation means which calculates and finds the velocity V of the moving fluid 7 by the use of a Doppler signal obtained by the photodetector 9.

In the present embodiment, the laser beam emitted from the laser 1 enters the reflection type diffraction grating 10 perpendicular to the direction t of the grating arrangement thereof as a convergent light beam 3 is slightly converged by the converging lens 2.

Figure 3:
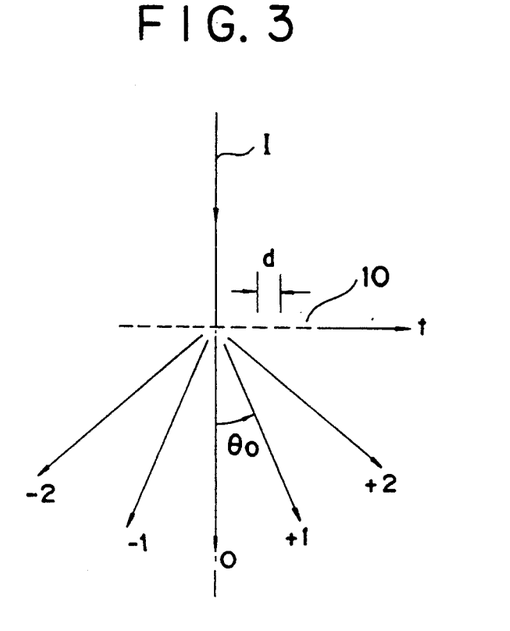
FIGS. 3 and 4 illustrate diffracted lights of various orders diffracted by a diffraction grating.

FIG. 3 illustrates the optical action of the diffraction grating 10.

FIG. 3 shows the diffracted light when a laser beam I enters a transmission type diffraction grating 10 having a grating pitch d perpendicular to the direction t of the grating arrangement, and the angle of diffraction $\theta_m$ at this time is as follows:

$$\sin \theta_m = m\lambda/d,$$

where m is the diffraction order number (0, 1, 2, ... ) and $\lambda$ is the wavelength of the laser beam.

The other ±nth-order diffracted light except 0order diffracted light are expressed by the following equation:

$$\sin \theta_n = \pm n\lambda/d \qquad (3)$$

$$(n = 1, 2, ...)$$

As is clear from equation (3), the angle of diffraction $\theta_n$ of ±nth-order diffracted lights varies in conformity with a variation in the wavelength $\lambda$ of the laser beam.

Figure 4:
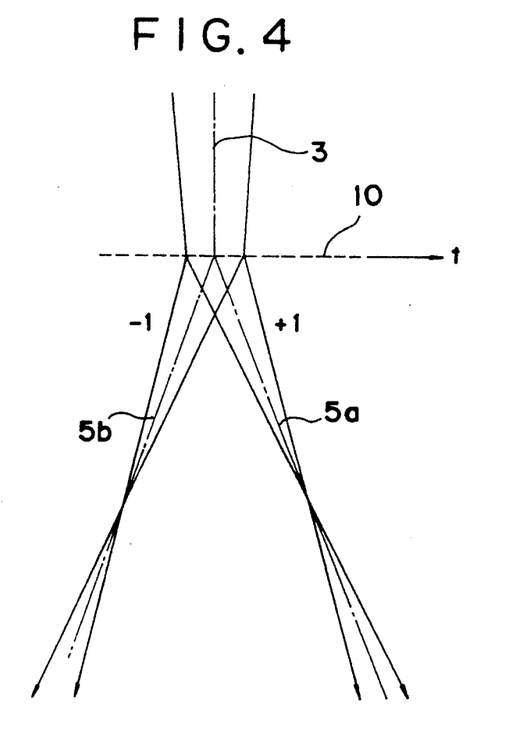

FIG. 4 illustrates the converged states of ±nth-order diffracted lights (n = 1) 5a and 5b when, as in the present embodiment, the convergent light beam 3 is made to enter the diffraction grating 10 perpendicularly thereto. The principal rays of the diffracted lights 5a and 5b are equal to equation (3), and taking up the light beam near the optic axis, ±nth-order diffracted lights are converged in the same length of optical path.

Figure 2:
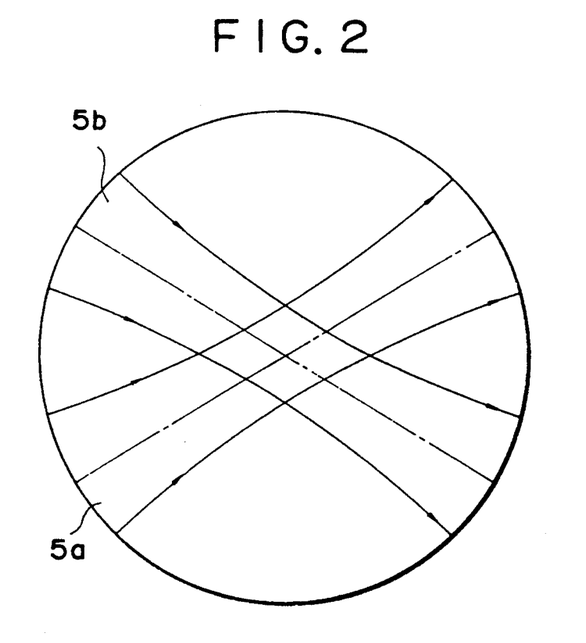
FIG. 2 illustrates the convergence intersection state of two diffracted lights in moving fluid.

In the present embodiment, ±nth-order (in the present embodiment, n =1) diffracted lights 5a and 5b, diffracted at an angle of diffraction $\theta_n$ by the diffraction grating 10, are reflected by the reflecting mirrors 5a and 5b, respectively, disposed perpendicularly to the direction of the grating arrangement, and enter the moving fluid 7 from different directions at an angle of incidence $\theta_n$ so as to be converged in the tube 102, as shown in FIG. 2, and to intersect with each other. That is, these diffracted lights enter the moving fluid 7 at an angle of incidence intersection ($2\theta_n$) equal to the angle of emergence intersection $2\theta_n$ of two diffracted lights outgoing from the diffraction grating.

At this time, from equations (2) and (3), the Doppler frequency F of the optical detector 9 is $$F = 2V\sin \theta_n/\lambda = 2nV/d \qquad (4)$$

That is, the Doppler frequency F does not depend on the laser beam I, and is in inverse proportion to the grating pitch d of the diffraction grating 10 and is proportional to the velocity of the moving fluid 7. The grating pitch d can be made sufficiently stable and therefore, the Doppler frequency F becomes a frequency proportional to only the velocity of the moving fluid 7 (fine particles P).

In the present embodiment, the optical system having the diffraction grating and mirrors is constructed so that by such a construction, the angles of diffraction of ±nth-order diffracted lights from the diffraction grating 10 may be varied and the angle $\theta$ of incidence onto the moving object may be varied, in conformity with a variation in the wavelength $\lambda$, and the ratio $\sin \theta/\lambda$ at this time may become substantially constant.

On the detection surface 9a of the photodetector 9 the condensing lens 8 condenses scattered lights of frequencies subjected to the Doppler shifts $\Delta f$ and $-\Delta f$ shown in equation (1) which are proportional to the velocity V of the moving fluid 7. At this time, the two scattered lights subjected to the Doppler shifts $\Delta f$ and $-\Delta f$ interfere with each other on the detection surface 9a. The photodetector 9 detects the quantity of light based on the brightness of the interference fringe at this time. That is, the photodetector 9 detects a Doppler signal which does not depend on the oscillating wavelength $\lambda$ of the laser 1 having the Doppler frequency F, $$F = 2V/d, \quad (5)$$

which is proportional to the velocity V wherein n=1 in the case of ±1st-order diffracted lights in equation (4). By the calculation means 14, the velocity V is found from equation (5) by the use of the output signal from the photodetector 9.

In the present embodiment, when the distance between the reflecting mirrors 6a and 6b is l and the grating spacing of the diffraction grating is d, the distance h between the diffraction grating 10 and the position of intersection of ±nth-order (n=1) diffracted lights 5a and 5b is $$h = l \times \sqrt{(d^2 - \lambda^2)/\lambda}.$$

That is, when the wavelength $\lambda$ of the laser beam varies, the position of intersection of the two diffracted lights 5a and 5b somewhat varies, but in the present embodiment, the entire Doppler velocimeter is made compact and the distance ( is made small so that the deviation of the position of intersection may become small. Also, simple temperature adjusting means can be used to thereby adjust the wavelength $\lambda$ so that the deviation of the position of intersection may become small.

Figure 9A:
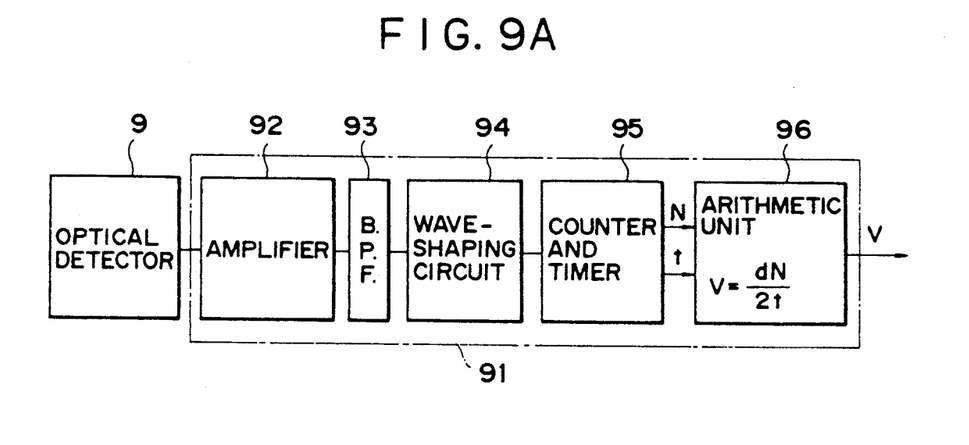
FIGS. 9A and 9B are a block diagram and a graph, respectively, of an embodiment showing the signal processing of a Doppler signal in the first embodiment of FIG. 1.

FIG. 9A is a block diagram showing an embodiment of the signal processing of the Doppler signal detected by the optical detector (photodetector) 9 of the present embodiment.

Figure 9B:
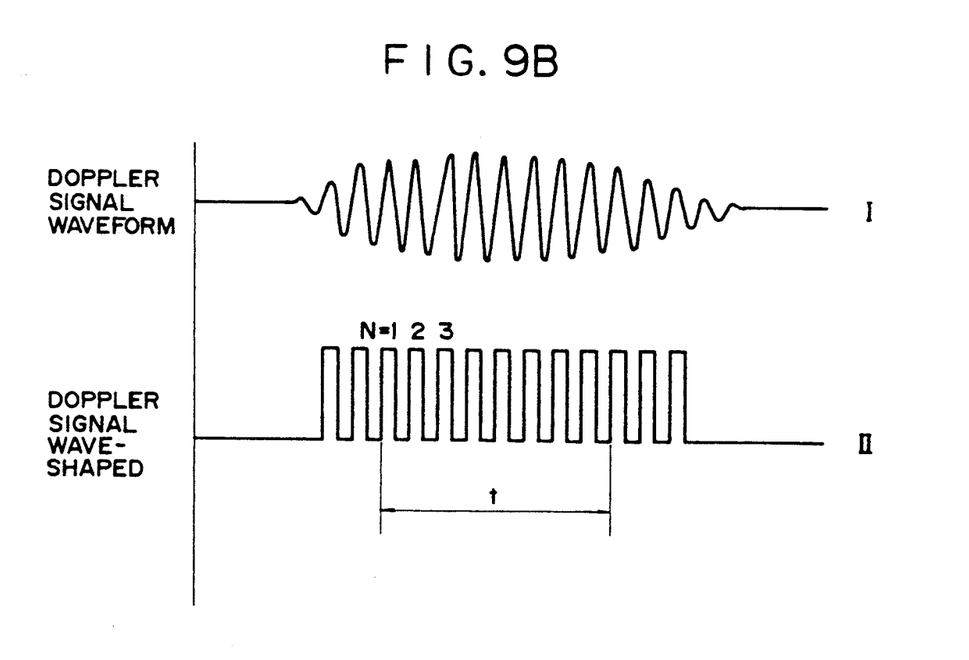

In FIG. 9A, the reference numeral 91 designates a signal processor which amplifies the Doppler signal from the optical detector 9 by an amplifier 92 and decreases noise by a band-pass filter (B.P.F.) 93. That is, it makes the Doppler signal into a waveform as shown by a signal I in FIG. 9B and inputs it to a wave-shaping circuit 94, and shapes it into a pulse wave as shown by a signal II in FIG. 9B. When the arrival of the Doppler signal is detected by a counter and timer 95, pulse number N (e.g. an integer such as 8 or 10) and time t conforming thereto are measured. Here, from the aforementioned equation (5), F=2V/d, the velocity V is $$V = dF/2 = dN/2t \quad (F = N/t).$$

Then, the velocity V is calculated from the pulse number N and the value of the time t by an arithmetic unit 96, and is output.

Further, the velocity data processed by the signal processor 91 are successively introduced into a computer and accumulated therein, and are data-processed in conformity with use.

Figure 5:
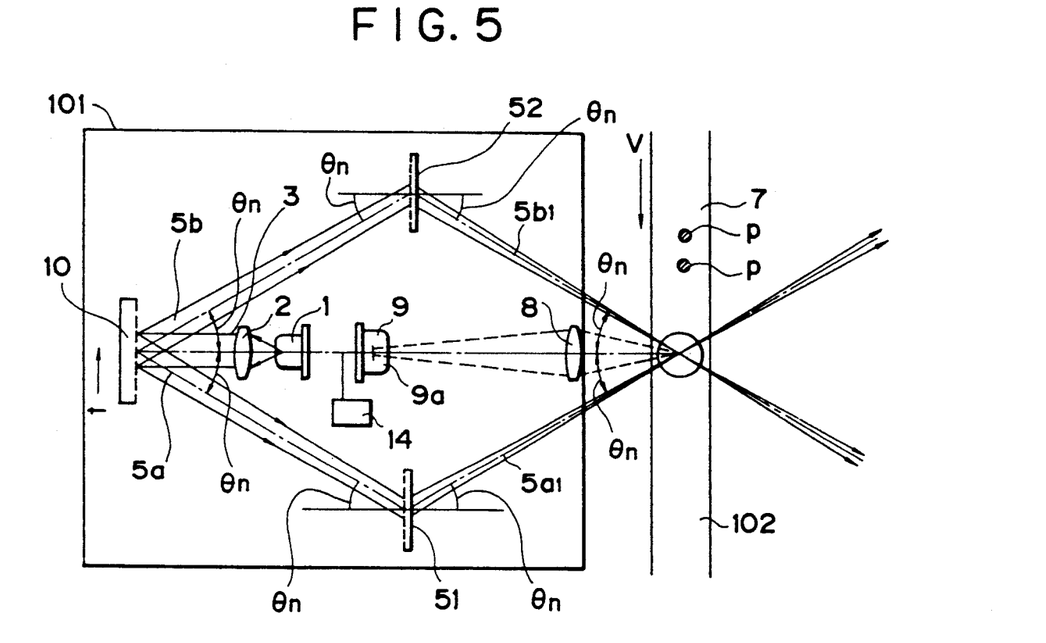
FIG. 5 is a schematic view of essential portions of an optical system according to a second embodiment of the present invention.

FIG. 5 is a schematic view of essential portions of an optical system according to a second embodiment of the present invention.

This embodiment differs from that of FIG. 1 in that by the use of transmission type diffraction gratings (auxiliary diffraction gratings) 51 and 52 having a grating pitch of d/2, instead of the mirrors 6a and 6b of FIG. 1, diffracted lights 5a and 5b are made to enter the moving fluid 7 in the tube 102, and is similar in the other points and principle of detection to the embodiment of FIG. 1.

In FIG. 5, ±nth-order diffracted lights 5a and 5b from the diffraction grating 10 are transmitted through and diffracted by the auxiliary diffraction gratings 51 and 52. Diffracted lights 5al and 5bl at this time are converted in the tube 102 and intersect each other. The angle of diffraction $\theta_n$ of the ±nth-order diffracted lights 5a and 5b from the diffraction grating 10 having a grating pitch d relative to the optic axis is, like equation (3), $$\sin \theta_n = n\lambda/d. \quad (6)$$

When with the optic axis inclined by $\theta_n$ as shown, the light beams (±nth-order diffracted lights) enter the auxiliary diffraction gratings 51 and 52 having a grating pitch d/2, the angle of diffraction $\theta_n'$ of the ±nth-order diffracted lights is $$\begin{aligned}\sin \theta_n' &= 2n\lambda/d - \sin \theta_0 \\ &= n\lambda/d\end{aligned} \quad (7)$$

and after all, $\theta_n' = \theta_n$.

Consequently, the angles of outgoing diffraction of the diffracted lights $5_{a1}$ and $5_{b1}$ from the auxiliary diffraction gratings 51 and 52 are $\theta_n$ and the angle of incidence intersection between the two diffracted lights in the moving fluid 7 in the tube 102 is $2\theta_n$.

From this, the Doppler frequency F is $$F = 2 \cdot \Delta f = 2V \sin \theta_n / \lambda \quad (8)$$

From equations (7) and (8), F is $$F = 2nV/d. \quad (9)$$

That is, an equation similar to the aforementioned equation (4) is obtained, and an effect similar to that of the first embodiment is obtained.

Particularly, in the present embodiment, the auxiliary diffraction gratings 51 and 52 are used, whereby the position of intersection of the two diffracted lights $5_{al}$ and $5_{bl}$ in the tube 102 (the moving fluid 7) becomes invariable even if the wavelength of the laser beam varies.

Figure 8A:
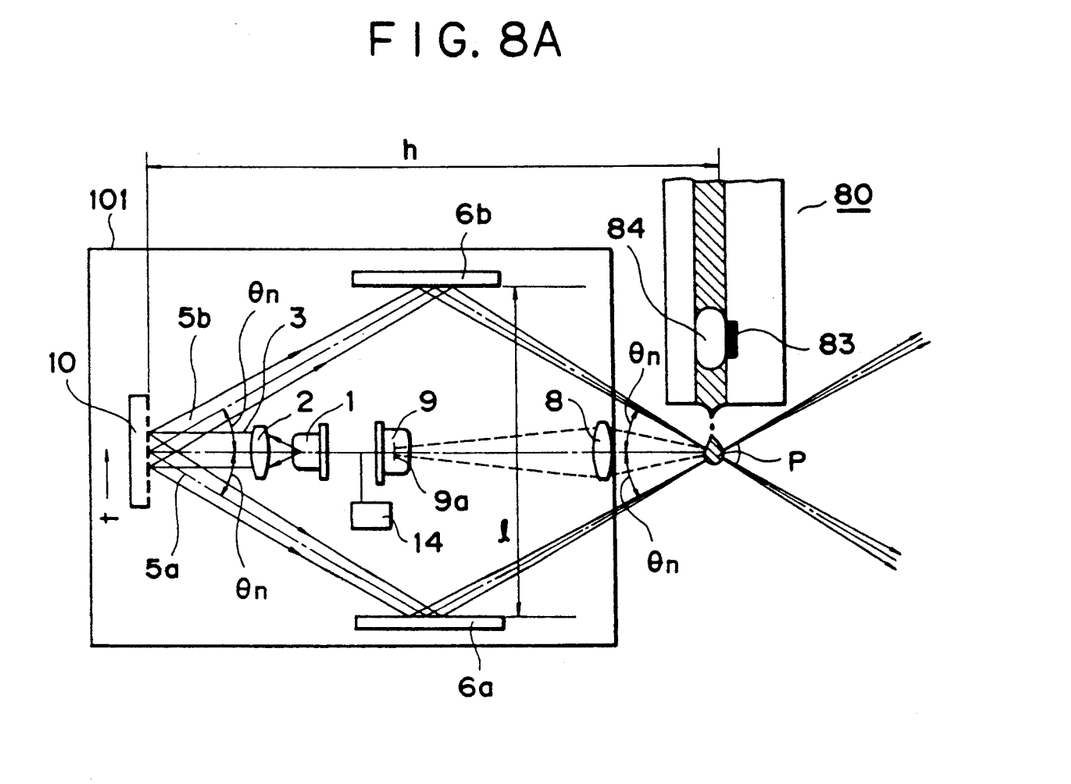
FIGS. 8A and 8B are schematic views of essential portions of a third embodiment of the present invention.

FIG. 8A is a schematic view of essential portions of a third embodiment of the present invention.

In the present embodiment, there is shown a case where an ink droplet (colored in blue, red or the like) discharged from a recording head 80 of the so-called bubble jet type is used as an object to be measured, and the construction as a Doppler velocimeter is similar to that of the first embodiment shown in FIG. 1.

Figure 8B:
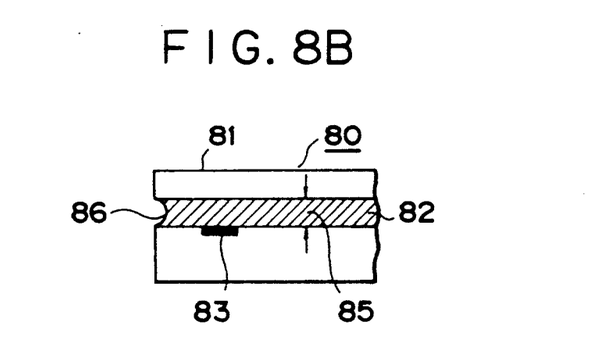

FIG. 8B is a cross-sectional view of essential portions of the recording head of the bubble jet type. In FIG. 8B, the reference numeral 81 designates a head body, and the reference numeral 82 denotes recording ink enclosed in a discharge path 85. The reference numeral 83 designates a heat generating resistance member which produces a bubble in the discharge path 85 by sudden heat generation.

The recording head 80 of FIG. 8A is shown in a state in which the heat generating resistance member 83 generates heat in response to electrical energy input thereto and produces a bubble 84, and by the pressure of this bubble 84 the ink 82 is made to fly out as an ink droplet P of a size the order of one micron from a discharge port 86 and to impinge on the surface of a recording medium (not shown) to thereby effect image recording.

The present embodiment detects the velocity of the ink droplet P at this time. That is, two light beams 5a and 5b are made to convergently enter the ink droplet P at a predetermined angle of intersection ($2\theta_n$) and scattered light subjected to the Doppler shift from the surface of the ink droplet P is condensed by the condensing lens 8 and further condensed on the detection surface 9a of the photodetector 9. The movement velocity of the ink droplet P is detected by a method similar to that of the first embodiment.

The Doppler velocimeter of the present embodiment can be applied not only to the measurement of the velocity of the ink liquid droplet in the aforedescribed ink jet recording apparatus, but also to various apparatuses dealing with fluid such as liquid or gas, including for example, a flow cytometer, a cell sorter and a fine particle detecting apparatus.

The flow cytometer is an apparatus in which specimen liquid such as a blood sample is made into a thin stream and is caused to flow into a transparent cell or air and a laser beam or the like is applied thereto to optically measure the scattered light by fine particles in the specimen liquid. This is described, for example, in U.S. Pat. No. 4,732,479. Also, the Doppler velocimeter of the present invention may be applied to an apparatus as described in U.S. patent application Ser. No. 588,747 wherein specimen liquid is made into a liquid droplet and discharged from a nozzle to thereby optically measure the liquid droplet.

The cell sorter is an apparatus which measures fine particles by the use of the mechanism of the aforedescribed flow cytometer and thereafter L sorts the fine particles in conformity with the kinds thereof and takes them separately. This is described, for example, in U.S. patent application Ser. No. 596,083 filed on Oct. 11, 1990.

The fine particle detecting apparatus is an apparatus for detecting or counting dust or bubbles which are fine particles in flowing liquid or gas by the use of an optical, acoustic or electrical technique. This is described, for example, in Japanese Patent Laid-Open Nos. 63-42448 and 63-1951.

While in the above-described embodiment, a reflection type diffraction grating is used, a transmission type diffraction grating is equally usable. Also, as the diffracted lights, besides ±1st-order diffracted lights ±2nd-order and higher order diffracted lights may be used.

The angle of incidence of the laser beam 3 onto the diffraction grating 10 need not always be a right angle, but the laser beam 3 may be made to enter at a predetermined angle. The ±nth-order diffracted lights produced from the diffraction grating 10 at this time may be made to enter the moving fluid while maintaining the same angle of incidence intersection as the angle of emergence intersection of the ±nth-order diffracted lights.

The object to be detected is not limited to moving fluid, but the present invention is equally applicable to moving objects such as a sheet and a belt.

According to the present invention, there can be achieved a Doppler velocimeter in which an optical system having a diffraction grating, mirrors, etc. is appropriately constructed so that the angle of incidence $\theta$ onto a moving object may vary in conformity with the fluctuation of the wavelength $\theta$ of the incident light beam and $\sin \theta/\lambda$ is set so as to assume a predetermined value and each element is constructed so that two diffracted lights diffracted by the diffraction grating may be converged by the moving object or moving fluid and may intersect with each other, whereby temperature adjusting means for a laser is made unnecessary or simple temperature adjusting means may be used and further, the use of a relatively large lens system in which aberration correction heretofore required in the detection of moving fluid has been made well is made unnecessary and which can detect highly accurate velocity information.

What is claimed is:

1. A Doppler velocimeter for detecting movement information of an object, comprising:
   a light source for producing a light beam;
   a diffraction grating on which said light beam is incident and which produces ±nth-order diffracted lights at an angle of outgoing intersection conforming to a wavelength of said light beam;
   an optical system for making said ±nth-order diffracted lights enter so as to intersect with each other at a position of the object at an angle substantially equal to said angle of outgoing intersection and converging said diffracted lights at the intersection position, said optical system having a lens system disposed in an optical path between said light source and said diffraction grating and for acting so that said ±nth-order diffracted lights are converged at the position of the object, said lens system acting so that said light beam is incident on said diffraction grating in a non-focused state and said ±nth-order diffracted lights are incident on the object in a focused state; and
   detection means for detecting a scattered light subjected to a Doppler shift produced from the object to which the ±nth-order diffracted lights are radiated.

2. A Doppler velocimeter according to claim 1, wherein said diffraction grating is a reflection type diffraction grating and produces ±nth-order reflected diffracted lights.

3. A Doppler velocimeter according to claim 1, wherein said diffracted lights are ±1st-order diffracted lights.

4. A Doppler velocimeter according to claim 1, wherein said light source includes a laser source.

5. A Doppler velocimeter according to claim 4, wherein said laser source includes a semiconductor laser.

6. A Doppler velocimeter according to claim 1, wherein said light source is disposed at a location more distant than a focus position of said lens system.

7. A Doppler velocimeter according to claim 1, wherein said optical system includes two mirrors disposed parallel to each other for reflecting said ±nth-order diffracted light and said −nth-order diffracted light, respectively, and making said diffracted lights enter said object.

8. A Doppler velocimeter according to claim 1, wherein said optical system includes auxiliary diffraction gratings for further diffracting said ±nth-order diffracted light and said −nth-order diffracted light and making said re-diffracted lights enter said object.

9. A Doppler velocimeter according to claim 1, wherein said object is an object in flowing fluid.

10. A Doppler velocimeter according to claim 1, wherein said object is a liquid droplet.

11. An apparatus for measuring a flowing fine particle, comprising:
   means for permitting a fluid including the fine particle to flow;
   a light source for producing a light beam;
   a diffraction grating on which said light beam is incident and which produces ±nth-order diffracted lights at an angle of outgoing intersection conforming to a wavelength of said light beam;
   an optical system for making said ±nth-order diffracted lights enter so as to intersect with each other at a flow position of the fine particle at an angle substantially equal to said angle of outgoing intersection and converging said ±nth-order diffracted lights at the intersection position, said optical system having a lens system disposed in an optical path between said light source and said diffraction grating and for acting so that said light beam is converged, said lens system acting so that said light beam is incident on said diffraction grating in a non-focused state and said ±-nth-order diffracted lights are incident on the flow of the fine particle in a focused state; and
   detection means for detecting a scattered light subjected to Doppler shift produced from the fine particle to which the ±nth-order diffracted lights are radiated.

12. A Doppler velocimeter for detecting a movement information of an object, comprising:
   a light source for producing a light beam;
   a diffraction grating on which said light beam is incident and which produces diffracted light to be radiated onto said object;
   optical components for making said diffracted light enter at a position of the object;
   a lens system disposed in an optical path between said light source and said diffraction grating and for acting so that said light beam is converged, said lens system acting so the said light beam is incident on said diffraction grating in a non-focused state and said diffracted light is incident on the object in a focused state; and
   detection means for detecting a scattered light subjected to Doppler shift produced from the object to which the diffracted light is radiated and for producing a detection signal according to the detecting,
   wherein said diffraction grating and said optical components are arranged so as to prevent a frequency change of the detection signal caused by wavelength change of said light beam.

13. A Doppler velocimeter according to claim 12, wherein said diffraction grating and said optical components are arranged so that said diffracted light and another light from said diffraction grating at an angle of outgoing intersection intersect with each other at the position of the object at an angle substantially equal to said angle of outgoing intersection to prevent a frequency change of the detection signal caused by wavelength change of said light beam.

14. A Doppler velocimeter according to claim 13, wherein said detection means detects scattered lights each caused by said diffracted light and said another light interfering with each other, and produces a signal corresponding to the interference of said scattered lights as said detection signal.

* * * * *

UNITED STATES PATENT AND TRADEMARK OFFICE
CERTIFICATE OF CORRECTION

PATENT NO. : 5,179,418
DATED : January 12, 1993
INVENTOR(S) : MAKOTO TAKAMIYA, ET AL.

It is certified that error appears in the above-identified patent and that said Letters Patent is hereby corrected as shown below:

IN THE DRAWINGS

In Fig. 7 - "OSCILATING" should read --OSCILLATING--.

COLUMN 1

Line 55, "When," should read --When--.

COLUMN 4

Line 18, "0order" should read --0-order--.
Line 34, "optical" should read --the optical--.

COLUMN 5

Line 36, "distance(" should read --distance $\ell$--.

COLUMN 7

Line 9, "size" should read --size on--.
Line 42, "L" should be deleted.

UNITED STATES PATENT AND TRADEMARK OFFICE
CERTIFICATE OF CORRECTION

PATENT NO. : 5,179,418
DATED : January 12, 1993
INVENTOR(S) : MAKOTO TAKAMIYA, ET AL.

It is certified that error appears in the above-identified patent and that said Letters Patent is hereby corrected as shown below:

<u>COLUMN 8</u>
  Line 9, "wavelength $\theta$" should read --wavelength $\lambda$--.
  Line 65, "$\pm$nth-" should read -- +nth- --.

<u>COLUMN 9</u>
  Line 3, "$\pm$nth-order" should read --+nth-order--.

<u>COLUMN 10</u>
  Line 10, "the" should read --that--.

Signed and Sealed this

Fourteenth Day of December, 1993

Attest:

BRUCE LEHMAN

Attesting Officer  *Commissioner of Patents and Trademarks*